(12) United States Patent
Baumeister et al.

(10) Patent No.: US 6,924,575 B2
(45) Date of Patent: Aug. 2, 2005

(54) ELECTRIC MACHINE

(75) Inventors: Jens Baumeister, Poppenhausen (DE); Knut Welke, Sulzheim (DE)

(73) Assignee: ZF Sachs AG, Schweinfurt (DE)

( * ) Notice: Subject to any disclaimer, the term of this patent is extended or adjusted under 35 U.S.C. 154(b) by 5 days.

(21) Appl. No.: 10/600,135

(22) Filed: Jun. 20, 2003

(65) Prior Publication Data

US 2003/0234593 A1 Dec. 25, 2003

(30) Foreign Application Priority Data

Jun. 22, 2002 (EP) .............................................. 02013850

(51) Int. Cl.$^7$ ............................ H02K 1/18; H02K 1/16
(52) U.S. Cl. ....................... 310/216; 310/217; 310/218; 310/254; 310/259
(58) Field of Search ................................ 310/216–218, 310/254, 259

(56) References Cited

U.S. PATENT DOCUMENTS 2,783,404 A 2/1957 Appenzeller
4,665,329 A * 5/1987 Raschbichler ............... 310/216

FOREIGN PATENT DOCUMENTS

| DE | 295 00 984 | 3/1995 |
|---|---|---|
| EP | 1 079 498 | 2/2001 |
| JP | 61085028 | 4/1986 |
| JP | 2001197691 | 7/2001 |
| JP | 2001339881 | 12/2001 |

* cited by examiner

Primary Examiner—Darren Schuberg
Assistant Examiner—J. Aguirrechea
(74) Attorney, Agent, or Firm—Cohen, Pontani, Lieberman & Pavane

(57) ABSTRACT

An electric machine includes a stator having a laminated core comprising a stack of sheet metal stampings having a central opening, a plurality of undercut anchoring elements around the central opening, and a hub which is cast in place in the central opening so that the anchoring elements are at least partially embedded in the hub.

10 Claims, 8 Drawing Sheets

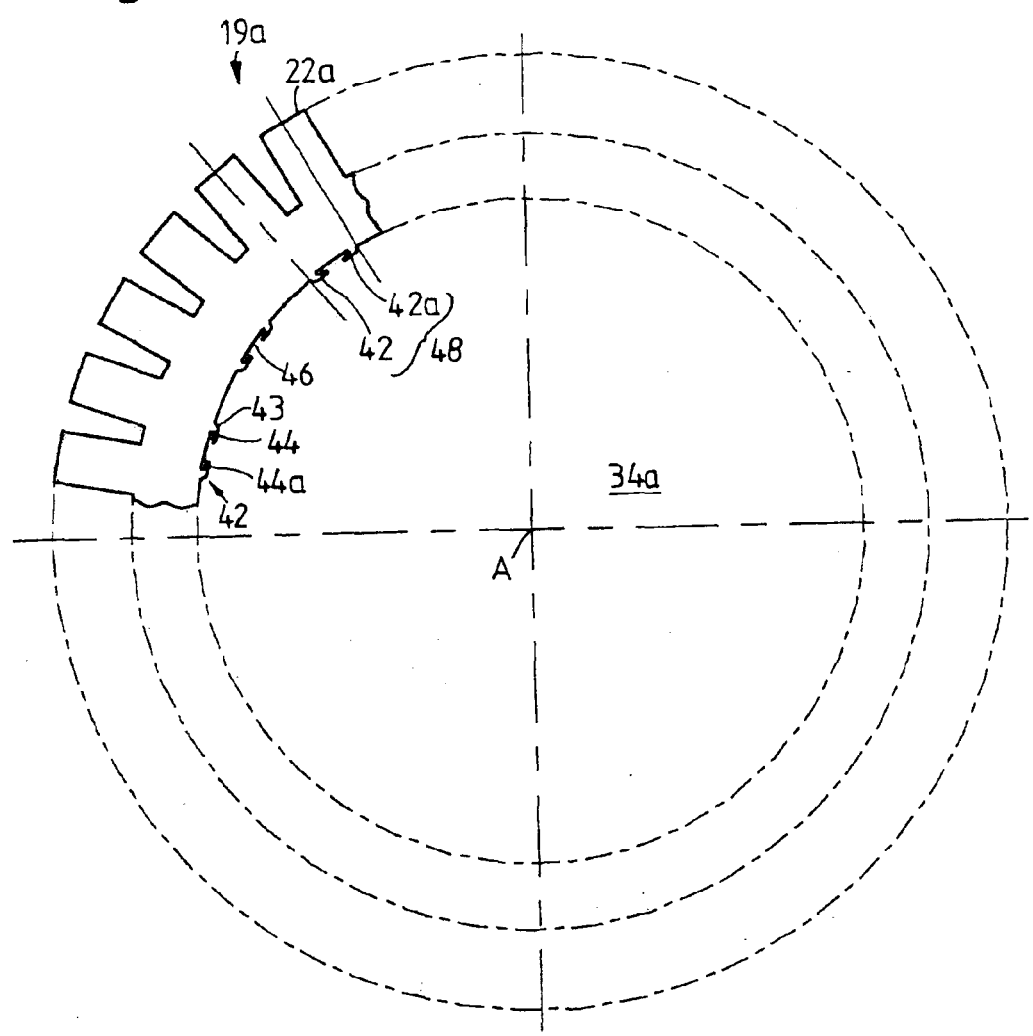

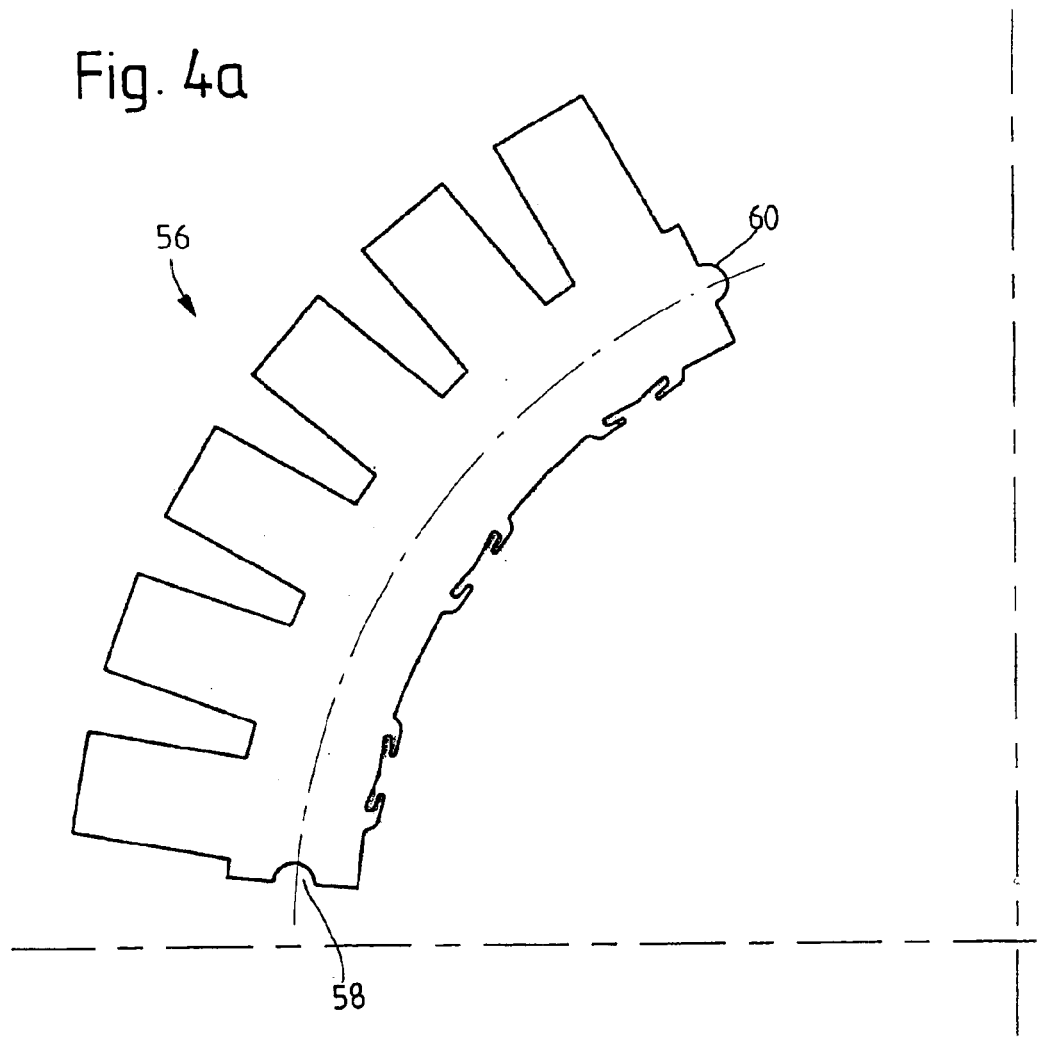

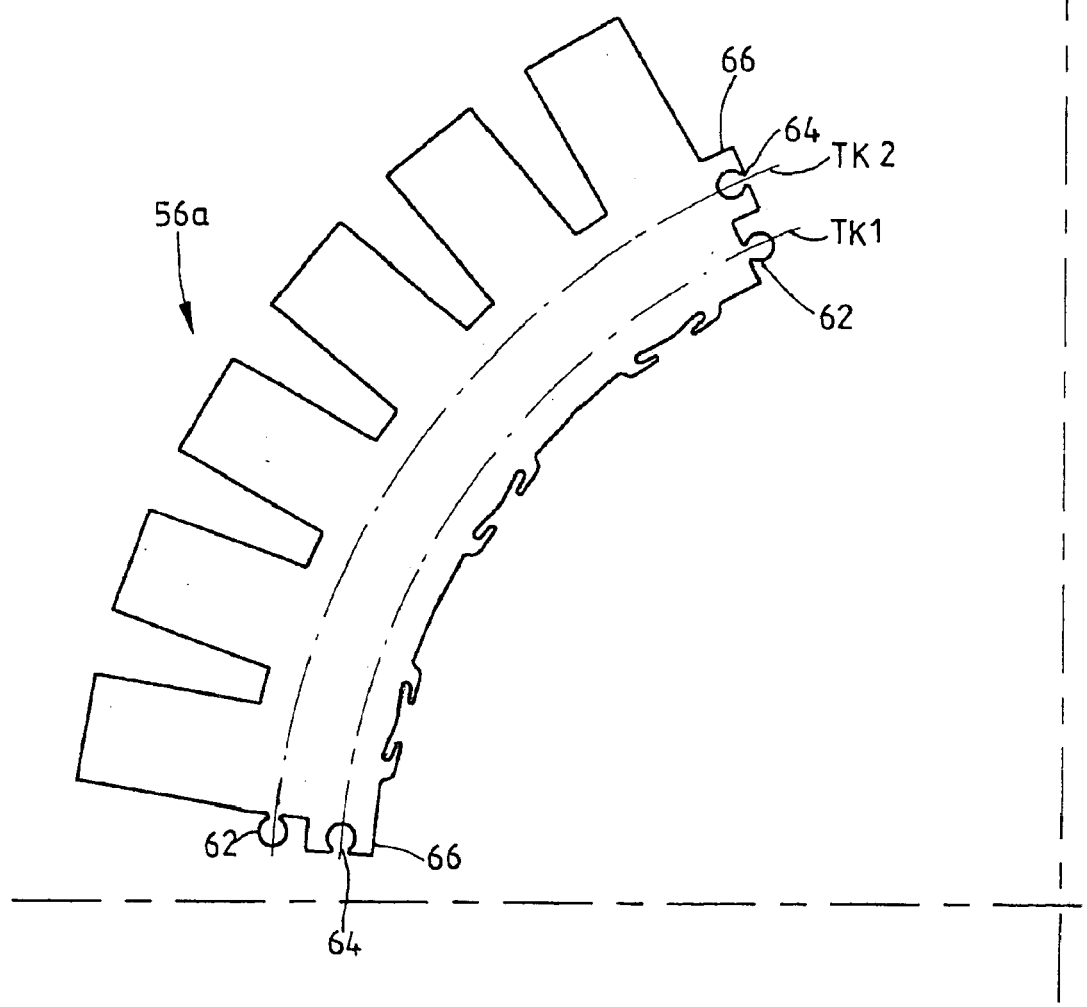

ELECTRIC MACHINE

BACKGROUND OF THE INVENTION

1. Field of the Invention

The invention pertains to an electric machine having a stator with a laminated core and hub received in a central opening of the core and fixed against rotation relative to the core.

2. Description of the Related Art

Electric machines are generally known. They comprise a stationary stator, which is assembled from lacquer-insulated, electric sheet steel stampings and carries an electrical winding, and a rotor, which is supported so that it can rotate relative to the stator. Internal rotors are installed radially inside the stator, and external rotors are installed radially outside the stator. In the latter type of motor, it is known that the laminated core of the stator can be supported on a metallic hub made out of, for example, aluminum or an aluminum alloy, and the core can thus be supported so that it will not rotate under the effect of reaction torques acting on it during the operation of the electric machine. Cooling channels are also formed inside the hub; these channels are connected to a coolant circuit, as a result of which the lost energy which accumulates as heat during operation can be carried away. So that heat can be transferred effectively between the laminated stator core and the hub, it is especially important that the contact zone between the two components be properly made. In this zone, the opposing surfaces of the laminated core and the hub should be designed to fit precisely together. When the stator of the electric machine is fabricated, the hub is usually cast separately, and then at least the surface of the hub which will be in contact with the laminated stator core is given a final machining. Independently of that process, the laminated stator core is fabricated by stacking the sheet metal stampings. The hub is then connected to the core by a shrink-fit process.

The production method described above is able to fulfill the functional requirements in a satisfactory manner, but it suffers from the disadvantage of being both labor-intensive and cost-intensive.

In the case of electric motors with an internal rotor, the conventional approach is to install the laminated stator core inside an external motor housing, which serves simultaneously to support and to cool the stator. For this purpose, it is already known that shrink-fitting can be replaced by a process in which a layer of aluminum alloy is cast around the laminated stator core. This reduces the production costs considerably. The shrinkage of the aluminum as it cools ensures that the housing encloses the laminated stator core tightly and with good surface-to-surface contact; good heat transfer across the contact surface is thus also made possible. A hardened steel bushing, which is inserted into the stator bore before the casting process, serves to center and to hold the laminated core in the die-casting mold. This bushing is not removed until the aluminum housing has cooled completely, which prevents the laminated stator core from warping.

In the case of motors with an external rotor, it is also desirable to form the stator hub, which is located in this case radially inside the laminated stator core, by casting the metal directly into the laminated core. This cannot be done in a straightforward manner, however, because the radially internal aluminum hub is subject to visible shrinkage as it cools after casting, and therefore at least certain areas of the hub will separate from the laminated core. A tight-fitting connection between the hub and the laminated stator core sufficient to meet the requirements cannot therefore be obtained. Casting experiments conducted by the applicant have shown that gaps are formed between the laminated core and the aluminum hub, and thus a sufficiently good bond cannot be obtained.

SUMMARY OF THE INVENTION

The object of the invention is to provide an electric machine with a hub, which is cast into the central opening in the laminated stator core, which hub is connected non-rotatably and with good surface-to-surface contact to the laminated stator core, with the result that the disadvantages of the state of the art are overcome.

The task is accomplished by providing the core with undercut anchoring elements around the central opening. When the hub is cast into the central opening in the laminated stator core, the anchoring elements provided on the laminated core are at least partially surrounded by the molten metal. When the metal cools, the hub shrinks, and the radially inward-directed tensile stresses are absorbed to some extent by the anchoring elements. The anchoring elements interrupt the continuous radial dimension of the hub, and the areas of the hub which are located radially outside the undercut contour are subject to only relatively minor thermally induced shrinkage. Thus, even after cooling, the hub will have a large, two-dimensional contact zone with the main body of the laminated core. The end result is that the hub and the laminated core are connected tightly together.

In an advantageous elaboration of the invention, the anchoring elements are designed to be parts of the sheet metal stampings themselves. As a result, it is possible to eliminate the use of separate anchoring elements, which would, for example, have to be pressed into the laminated core. The stator can thus be fabricated at low cost.

Anchoring elements which are designed as hooks projecting from the sheet metal stampings have been found effective. These projections cause hardly any decrease in the propagation of the magnetic flux in the stampings in comparison with the original design. This design measure can thus be implemented basically in any type of laminated stator core without disadvantage to the physical properties and requires little or no extra fabrication work.

As an alternative, however, it is also possible for the anchoring elements to be formed by openings in the stampings. Because only the radially innermost areas of the stampings are affected by these openings, there will be hardly any interference with the propagation of the magnetic flux in the electric machine in this case as well.

The previously described designs provide at least a radially secure and torsion-proof connection between the laminated core and the hub. The axial fixation of the hub can be improved by arranging the anchoring elements so that intermediate axial spaces are formed, in which the hub can form a corresponding layered structure during the casting process. As a result of this measure, additional axial surfaces are formed, which have the effect of increasing the size of the contact surface and of improving the heat transfer between the hub and the laminated stator core even more.

The tensile stresses which develop during the cooling of the cast hub can lead to an undesirable oval deformation of the core. This effect can be suppressed almost completely by distributing identical anchoring elements or groups of various anchoring elements uniformly around the circumference of the laminated core. In the ideal case, the tensile forces acting on the center of the stator, through which the axis of the machine passes, will cancel each other out.

With respect to the casting process, it is advantageous in engineering terms for the hub to have a shoulder at each of the end surfaces of the laminated core. This makes it possible to prevent the uncontrolled escape of molten metal from the mold.

In combination with the collar mentioned above, it is also advantageous for the stampings to be welded together along their radially outer contour. This prevents the laminated core from fanning out in the axial direction at its external contour.

In an especially advantageous design of the invention, a stamping is formed out of at least two segments, arranged next to each other in the circumferential direction. Because of the more effective use of the material, the stators of electric machines can be fabricated at much lower cost. The hub, which is cast into the interior space after the segments have been assembled, holds the laminated core tightly together by the effect of the tensile stresses. There is no need to take any other design measures to hold the segments together.

The laminated core will be held together in an especially reliable manner if the segments of axially adjacent layers are offset in the circumferential direction with respect to each other. This reliably prevents the stator from undergoing any undesirable deformation when the hub is cast.

In a different but also advantageous variant, the segments of axially adjacent layers are arranged congruently on top of each other. To fabricate the laminated core, the segments are stacked to form segment groups, which are then assembled side by side in a subsequent step.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIGS. 2a and 2b are partial plan views of laminated stator cores with anchoring elements of various designs.

FIGS. 4a and 4b are schematic plan views of individual segments of a multi-part stamping.

DETAILED DESCRIPTION OF THE PRESENTLY PREFERRED EMBODIMENTS

Figure 1:
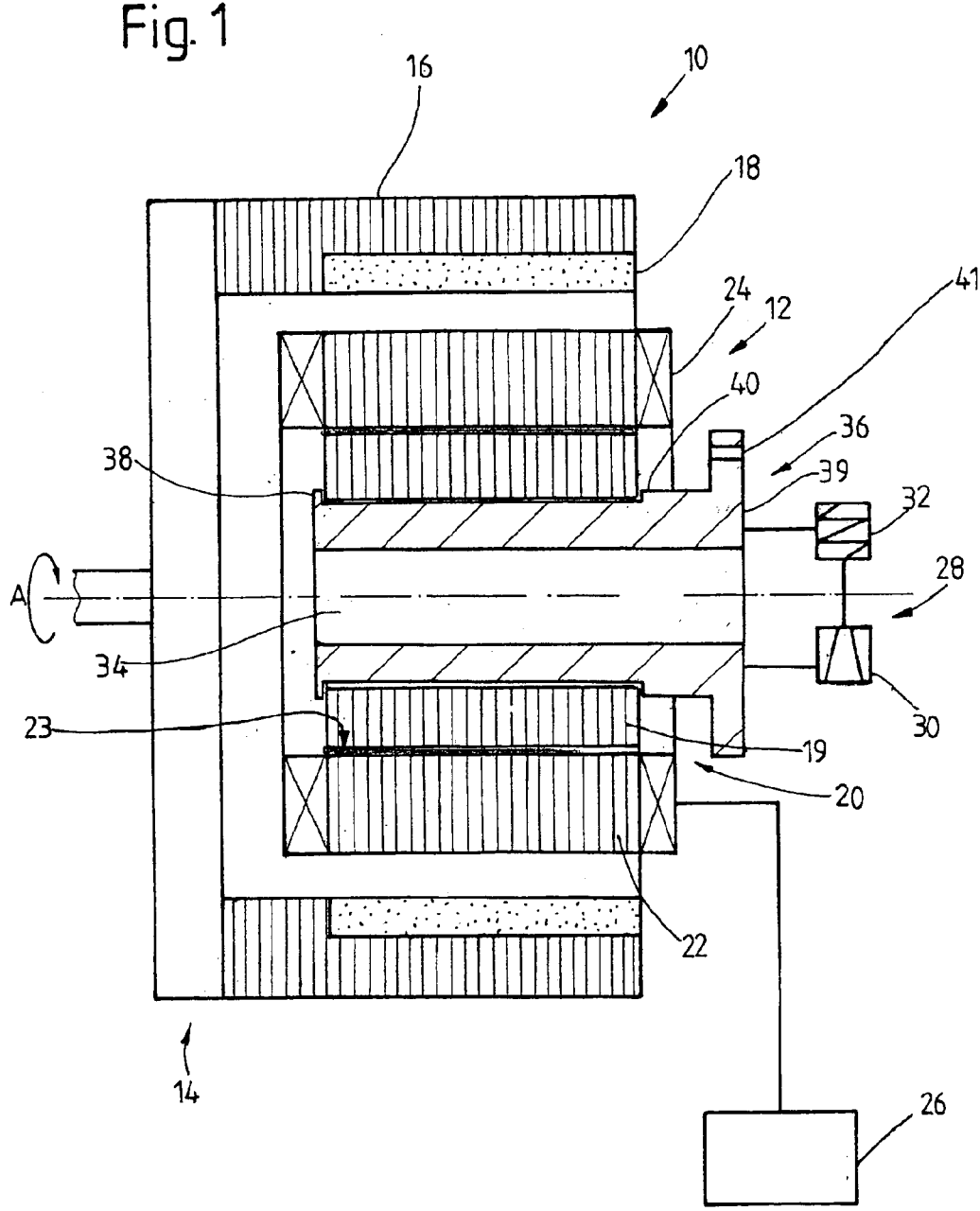
FIG. 1 is a schematic axial cross-section of an electric machine of the external rotor type.

FIG. 1 shows a schematic diagram of an electric machine 10 of the external rotor type. An electric machine of this type, which can be designed as, for example, a permanent magnet-excited synchronous machine, has a fixed stator 12 and a rotor 14, which rotates around an axis A. The rotor 14 comprises a laminated core 16, which has a plurality of permanent magnets 18 on the inner circumferential surface. The stator 12 comprises an additional laminated core 20, formed out of sheet metal stampings 19; this core carries a number of winding teeth 22 radially on the outside, which are either formed directly on the laminated core 20 or are produced separately and then attached to the laminated core 20. The individual stampings 19 are insulated electrically from each other by a coating and are assembled by stacking them together. Alternatively or in addition, the stampings 19 can be bonded with a baked lacquer or held together along their external contour by several axial laser welds 23, which are preferably made at the base of the slot or on the inside diameter. In the slots between the winding teeth 22, electrical windings in the form of coils 24 are provided. The windings 24 are assigned to the individual electrical phases, the windings 24 assigned to a common phase being wired together and connected via appropriate electrical connections and terminals to an electronic power unit 26, which controls the electric machine 10. When current flows through the windings 24, the magnetic field of the electric machine 10 is generated, which in turn produces the driving force. The stator 12 has a central opening 34, in which a cast-in hub 36 of a light metal alloy such as an aluminum material is provided, this hub being connected nonrotatably to the stator 12. The hub 36, which is advantageously produced by a die-casting process, extends over the entire axial length of the laminated stator core 20 and has a shoulder 38, 40 at each end; these shoulders hold the laminated stator core together in the radially inner area. The shoulders 38, 40 project radially outward beyond the inside contour of the laminated core 20 by only a few millimeters, e.g., 2–5 mm. These small shoulders are sufficient to define precisely the axial contour of the hub 36 during the casting process and reliably prevent the molten casting metal from escaping from the central opening 34. Upon solidification, the cast hub 36 shrinks both in the axial and in the radial direction. As a result of the axial shrinkage, the laminated core 20 is subjected to axial pressure in its radially inner area. This pressure can cause the individual stampings 19 to fan out axially in the axially outer area of the core 20. This effect can be avoided by the previously mentioned laser weld 23. One end of the hub 36 is designed as a flange 39 and has a bore 41 by which the stator 12 can be attached to a stationary component (not shown) such as a bracket, the housing of an internal combustion engine, or the housing of a transmission. The hub 36 also comprises cooling channels (not shown), which are filled with a coolant and which represent a part a cooling system 28 for the electric machine 10. During the operation of the electric machine 10, the lost energy accumulating as heat is transferred to the coolant, which is then sent by a coolant pump 30 to a heat exchanger 32 and thus removed from the cooling system 28.

The way in which the cast hub 36 is connected to the laminated stator core 20 is explained in the following. FIG. 2a shows part of a circular stator stamping 19a of electric steel sheet with a central opening 34a. On its outer circumference, the stamping 19a has radially projecting poles or winding teeth 22a, whereas, on the inner contour, it has a plurality of hook-shaped anchoring elements 42, 42a, which project out from the base of the stamping. The anchoring elements are connected to the sheet metal stamping 19a by short, essentially radial arms 43. The anchoring elements also have sections 44, 44a, which extend essentially in the circumferential direction. From the perspective of an axis A perpendicular to the plane of the drawing, which also represents the axis of the electric machine, the anchoring elements 42, 42a on the sheet metal stamping 19a and thus on the laminated stator core 20 have a contour which is undercut in the radial direction. This contour encloses an intermediate space 46. The elements 42, 42a differ with respect to the direction in which the sections 44, 44a extend. Two anchoring elements 42, 42a in each case are arranged so that sections 44, 44a face each other to form an anchoring pair 48. In FIG. 2a, each winding tooth 22a has its own anchoring element 42 or 42a, which is slightly offset from the line which bisects the winding tooth 22a. The angular pitch of the winding teeth 22a is equal to half the pitch of the congruent anchoring elements 42 and to half the pitch of the other congruent elements 42a; this means that an anchoring element 42 repeats on only every second winding tooth 22a. Identical anchoring elements 42 or 42a are spaced uniformly around the inner circumference of the laminated core. Thus the anchoring pairs 48 are also distributed uniformly around the laminated core 20.

Figure 2B:
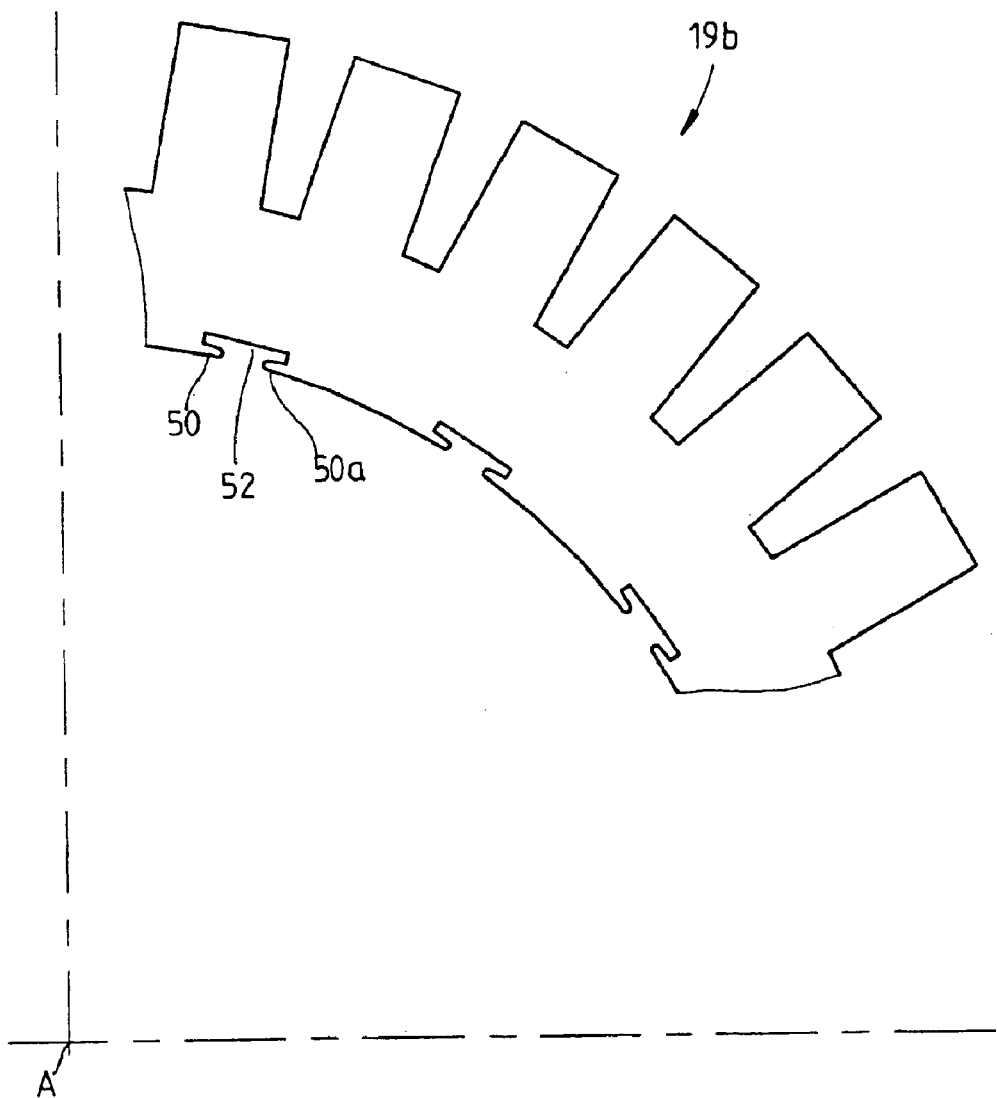

As an alternative to the diagram of FIG. 2a, FIG. 2b shows anchoring elements 50, 50a, which are made by providing openings in the inner circumferential area of each sheet metal stamping 19a. The radial dimension of the opening 52 was selected so that little if any effect is exerted on the propagation of the magnetic field lines during the operation of the electric machine 10.

Figure 2C:
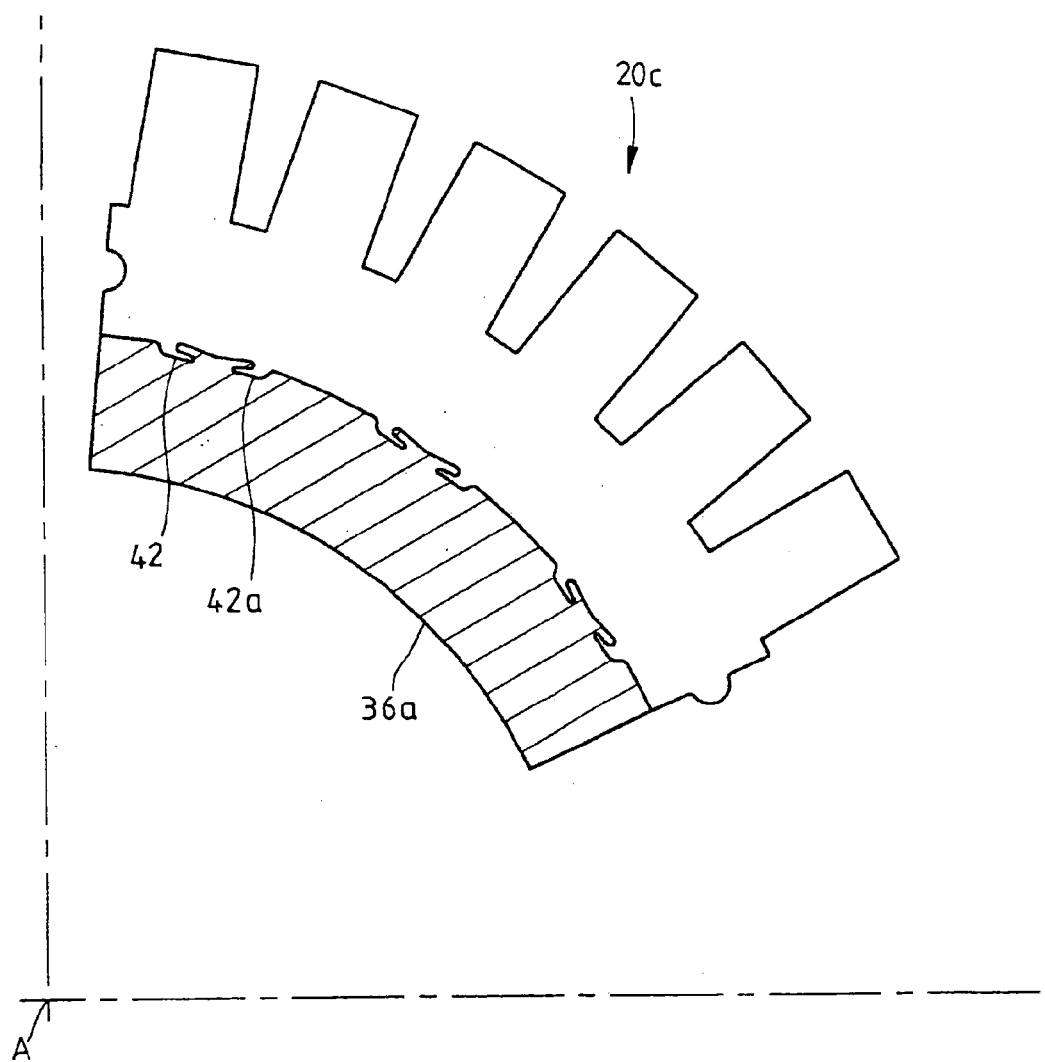
FIG. 2c is a radial cross section of the connecting area between a laminated stator core and a hub, which has been cast inside the stator.

For the sake of clarity, FIG. 2c shows a partial schematic diagram of a radial cross section of the connecting area of a laminated core 20c, in which a hub 36a has been cast.

Figure 3:
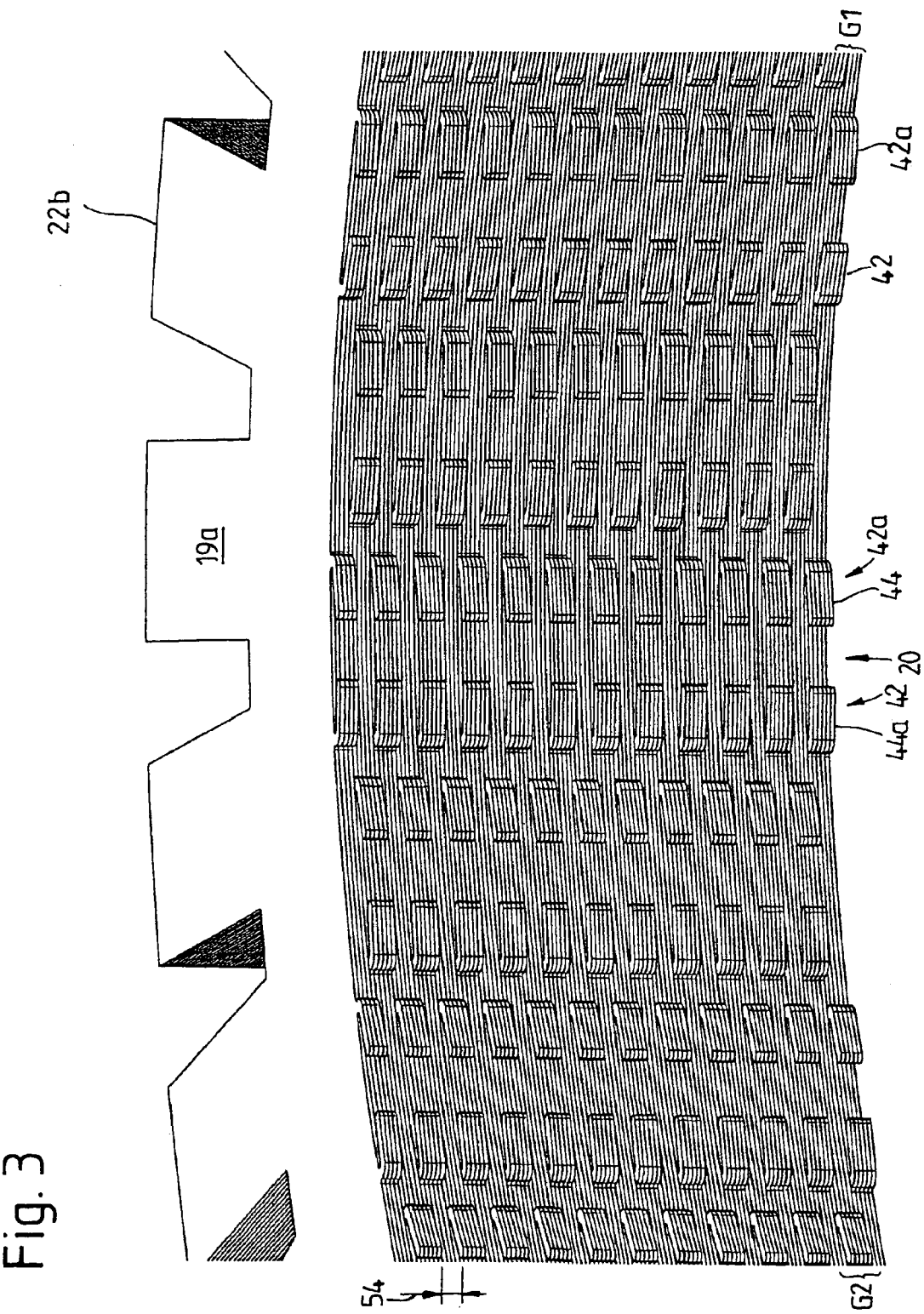
FIG. 3 is a partial perspective view of a laminated core, in which the anchoring elements are arranged to form axial groups.

The first step in forming a complete laminated stator core 20, as shown in perspective in FIG. 3, is to stack several sheet metal stampings 19a, e.g., five stampings such as those shown in FIG. 2a, in congruent fashion to form a first group G1. When this is done, several anchoring elements 42, 42a are also combined simultaneously. A second group G2, also consisting of the same number of stampings, is stacked congruently with the winding teeth 22b and the slots of the first group, but the second group is rotated by one unit of pole pitch, so that the structure formed by the anchoring elements is not aligned with that of the first group G1. In this way, the anchoring elements 42, 42a on the laminated stator core 20 form intermediate axial spaces 54, in which the hub (not shown in this figure) can form a laminated structure corresponding to that of the core during the casting process. The hub is thus held in place axially in the laminated stator core 20. The undercut areas between the sections 44, 44a and the base of the laminated core are also filled by the cast material. The anchoring elements 42, 42a of the laminated core 20 are at least partially embedded in the material of the cast hub and thus produce the desired torsion-proof connection with full surface contact.

Instead of circular stampings in the form of closed rings, the laminated stator core 20 can also be produced by stacking individual segments, at least two of which are combined to form a closed, circular ring. FIG. 4a shows here an individual segment 56, extending around an angle of 60°, six of which are required to form the complete stamping. As connecting elements, a semicircular opening 58 is provided at one circumferential end of each segment, and a corresponding semicircular projection 60 is provided at the other circumferential end. These connectors are located on the same pitch circle, so that, when several individual segments 56 are assembled, the connectors will engage positively with each other and form a connected structure. The design of the anchoring elements in the radially inner area is the same as that already discussed in conjunction with FIG. 2a.

Another example of a segmented stamping is shown in FIG. 4b, where the terminal connectors are different from those shown by way of example in FIG. 4a. The individual segment 56a has in this case two complementary connecting elements 62, 64 at one end, which are located on the pitch circles TK1 and TK2. The element 62 is designed as a circular projection, and the element 64 is designed as a corresponding circular opening, which has been stamped out of an extension 66. Two more connecting elements 62, 64 are provided on the opposite end of the segment 56a on the same pitch circles TK1 and TK2. These connectors are also designed so that, when two individual segments 56a are brought together, one of the elements 62 engages positively in one of the elements 64.

It can be seen from FIGS. 4a and 4b that a closed stamping must consist of at least two segments. Depending on the size of the electric machine, however, it is also possible to assemble 5, 6, 7, or 12 segments or, in general, any desired number of individual segments to form a circular, ring-shaped stamping.

Figure 5A:
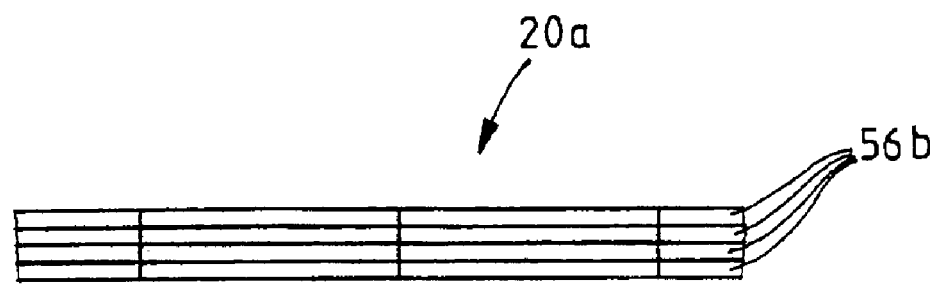
FIGS. 5a and 5b are schematic side views of stacking arrangements for laminated stator cores fabricated by the stacking of individual segments.
Figure 5B:
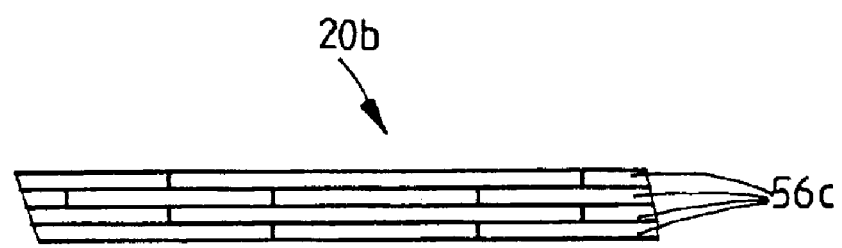

When a laminated stator core 20 is formed by assembling individual segments 56b, these can, in the simplest case, be arranged so that they are congruent in the axial direction, as shown schematically in FIG. 5a in a partial side view. Alternatively, as shown in FIG. 5b, the segments 56c of axially adjacent layers can be arranged with an offset with respect to each other in the circumferential direction of the laminated core 20b. In this case, the connecting areas of each pair of individual segments will be bridged by the axially adjacent layers. Therefore, simply as a result of the positive interconnection of the individual segments, a laminated core is obtained which is already able to hold itself together relatively solidly. Of course, several segments can be stacked congruently on top of each other first to form a first group and then stacked onto a second group with an offset in the circumferential direction by an amount equal at least to the angular pitch between one winding tooth and the next. When the stator hub is cast into a laminated core made of up of individual segments, the shrinkage which occurs during cooling produces a radially inward-directed tensile force, which reliably holds the laminated core together without any additional measures.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. An electric machine comprising a stator, said stator comprising:
a laminated core comprising a stack of sheet metal stampings having a central opening and a plurality of radially undercut anchoring elements around the central opening, said stack comprising first and second groups of sheet metal stampings, the anchoring elements of the first groups being axially aligned and separated by intermediate spaces between said first groups, the anchoring elements in the second groups being axially aligned and separated by intermediate spaces between said second groups, the anchoring elements of the first groups being circumferentially offset from the anchoring elements of the second groups; and a hub which is cast in place in said central opening so that said anchoring elements are at least partially embedded in said hub, said hub forming a structure in said immediate spaces.

2. An electric machine as in claim 1 wherein said anchoring elements are an integral part of said sheet metal stampings.

3. An electric machine as in claim 2 wherein said anchoring elements are formed as hooks which project into said opening.

4. An electric machine as in claim 2 wherein said anchoring elements are formed by anchoring openings which lie radially outside of said central opening.

5. An electric machine as in claim 1 wherein said anchoring elements comprise identical anchoring elements which are distributed uniformly in the circumferential direction.

6. An electric machine as in claim 1 wherein said hub has opposed axial ends formed with respective shoulders which axially engage said core.

7. An electric machine as in claim 1 wherein said laminated core has a radially outer contour where the sheet metal stampings are welded together.

8. An electric machine as in claim 1 wherein each said stamping comprises a plurality of segments having circumferential ends which are joined together at connecting areas.

9. An electric machine as in claim 8 wherein the connecting areas of at least some of said stampings are circumferentially offset from the connecting areas of axially adjacent stampings.

10. An electric machine as in claim 9 wherein the segments of some of said axially adjacent stampings are congruent with each other.

* * * * *